(12) United States Patent
Collins et al.

(10) Patent No.: US 8,050,004 B2
(45) Date of Patent: Nov. 1, 2011

(54) POWER CIRCUIT WITH FEED THROUGH PROTECTION CIRCUIT

(75) Inventors: Mark J. Collins, Windsor Locks, CT (US); Justin R. Mattern, East Hartford, CT (US)

(73) Assignee: Hamilton Sundstrand Corporation, Windsor, CT (US)

( * ) Notice: Subject to any disclaimer, the term of this patent is extended or adjusted under 35 U.S.C. 154(b) by 397 days.

(21) Appl. No.: 12/426,269

(22) Filed: Apr. 19, 2009

(65) Prior Publication Data

US 2010/0265624 A1  Oct. 21, 2010

(51) Int. Cl.
*H02H 9/00* (2006.01)

(52) U.S. Cl. ............. 361/56; 361/18; 361/91.1; 361/21; 361/111

(58) Field of Classification Search .................. 361/56, 361/91.1, 18, 21, 111
See application file for complete search history.

(56) References Cited

U.S. PATENT DOCUMENTS

| | | | |
|---|---|---|---|
| 5,015,918 A | 5/1991 | Copeland | |
| 5,270,898 A | 12/1993 | Elms et al. | |
| 5,325,315 A | 6/1994 | Engel et al. | |
| 5,371,666 A | 12/1994 | Miller | |
| 5,418,677 A | 5/1995 | Engel | |
| 5,461,263 A | 10/1995 | Helfrich | |
| 5,465,011 A | 11/1995 | Miller et al. | |
| 5,525,985 A | 6/1996 | Schlotterer et al. | |
| 5,581,454 A | 12/1996 | Collins | |
| 5,615,097 A | 3/1997 | Cross | |
| 5,627,716 A | 5/1997 | Lagree et al. | |
| 5,751,234 A | 5/1998 | Schlotterer et al. | |
| 5,838,127 A | 11/1998 | Young et al. | |
| 5,864,472 A | 1/1999 | Peterson | |
| 5,875,085 A * | 2/1999 | Farley | 361/18 |
| 6,055,145 A | 4/2000 | Lagree et al. | |
| 6,075,326 A | 6/2000 | Nostwick | |
| 6,316,956 B1 | 11/2001 | Oglesbee | |
| 6,445,599 B1 | 9/2002 | Nguyen | |
| 6,538,345 B1 | 3/2003 | Maller | |
| 6,678,183 B2 | 1/2004 | Creger et al. | |
| 6,952,355 B2 | 10/2005 | Riggio et al. | |
| 7,117,683 B2 | 10/2006 | Thompson | |
| 7,193,396 B2 | 3/2007 | Orr | |
| 7,253,535 B2 | 8/2007 | Duesterhoff | |
| 7,272,514 B2 | 9/2007 | Qi | |
| 7,279,967 B2 | 10/2007 | Quilter | |
| 7,439,715 B2 | 10/2008 | Rozman | |
| 7,448,220 B2 | 11/2008 | Schmidt et al. | |
| 7,486,053 B2 | 2/2009 | Qi | |
| 7,629,710 B2 * | 12/2009 | Tonicello | 307/86 |
| 2002/0079865 A1* | 6/2002 | Thomas et al. | 320/136 |
| 2003/0132732 A1* | 7/2003 | Thomas et al. | 320/134 |
| 2009/0251099 A1* | 10/2009 | Brantner et al. | 320/101 |

* cited by examiner

*Primary Examiner* — Patrick Salce
(74) *Attorney, Agent, or Firm* — Carlson Gaskey & Olds, P.C.

(57) ABSTRACT

A power circuit includes a gate drive sever comparator circuit operable to disconnect a pre-drive transistor circuit from ground in response to an over voltage fault condition. A back-up gate drive comparator circuit operable to switch a reference directly into a multiple of shunt MosFets such that the multiple of shunt MosFets are turned on to reverse the over voltage fault condition until voltage drops and the gate drive sever comparator circuit and the back-up gate drive comparator circuit turn off to maintain a regulated voltage between comparator controlled limits.

13 Claims, 5 Drawing Sheets

US 8,050,004 B2

POWER CIRCUIT WITH FEED THROUGH PROTECTION CIRCUIT

STATEMENT REGARDING FEDERALLY SPONSORED RESEARCH OR DEVELOPMENT

This disclosure was made with Government support under N00019-06-C-0081 awarded by The United States Navy. The Government has certain rights in this disclosure.

BACKGROUND

The present disclosure relates to an electrical power supply system, and more particularly to a Back UP Gate Drive Circuit to regulate a voltage in response to an over voltage fault condition.

Modules within an aircraft electrical system such as an aircraft Flight Control Computer (FCC) are often provided with redundant power supplies. In a typical rotary-wing aircraft, the FCC module utilizes a three phase PMA input source which is regulated to 34 VDC with a redundant 28V power supply sourced from a battery bus. A blocking diode in series with the 28V input connects these two inputs together at an "OR point" for redundant voltage input. If the PMA is connected and running, the shunt regulator's resulting 34 VDC output back biases the diode and allows operation off of the 34V input only. If the PMA is not connected, the remaining 28V input takes over operation such that one input is always connected. The "OR point" is the source voltage for the FCC module as well as for feed through power to other modules.

Although effective, an over voltage condition at the "OR point" source, which is normally regulated to between 33 and 35V, may damage the FCC module and those modules external to the FCC module.

SUMMARY

A power circuit according to an exemplary aspect of the present disclosure includes a gate drive sever comparator circuit operable to disconnect a pre-drive transistor circuit from ground in response to an over voltage fault condition. A back-up gate drive comparator circuit operable to switch a reference directly into a multiple of shunt MosFets such that the multiple of shunt MosFets are turned on to reverse an over voltage fault condition until voltage drops and the gate drive sever comparator circuit and the back-up gate drive comparator circuit turn off to maintain a regulated voltage between comparator controlled limits.

A method of voltage control for a shunt regulator circuit according to an exemplary aspect of the present disclosure includes disconnecting a pre-drive transistor circuit operable to control a multiple of shunt MosFets from ground in response to an over voltage fault condition with a gate drive sever comparator circuit. Switching a reference directly into the multiple of shunt MosFets with a back-up gate drive comparator circuit such that the multiple of shunt MosFets are turned on to reverse the over voltage fault condition until voltage drops and the gate drive sever comparator circuit and the back-up gate drive comparator circuit turn off to maintain a regulated voltage between comparator controlled limits.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
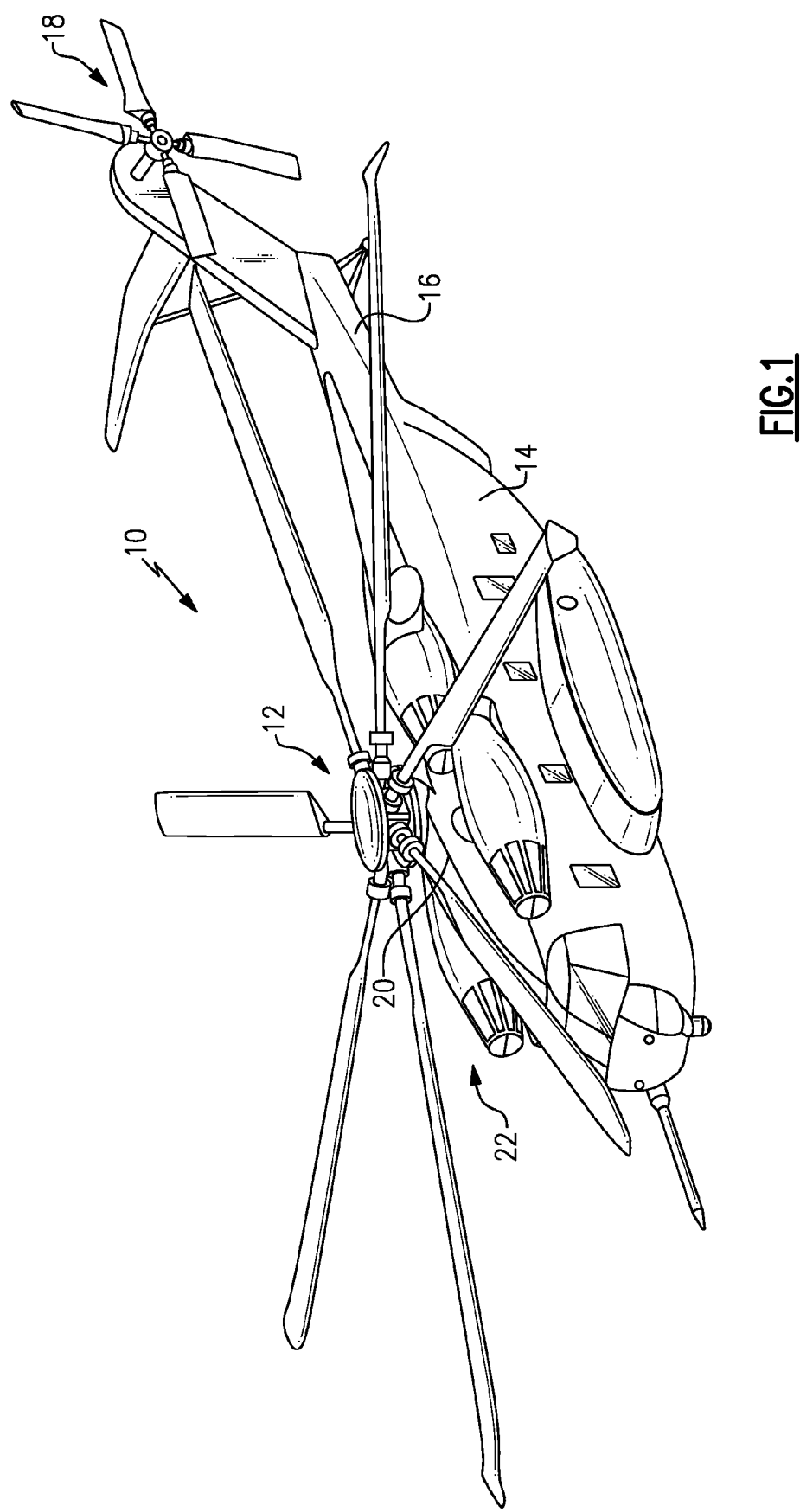
FIG. 1 is a general perspective view of an exemplary rotary wing aircraft embodiment for use with the present disclosure.

FIG. 1 schematically illustrates a rotary-wing aircraft 10 having a main rotor system 12. The aircraft 10 includes an airframe 14 having an extending tail 16 which mounts an anti-torque system 18. The main rotor system 12 is driven through a main rotor gearbox (MGB) 20 by a multi-engine powerplant system 22—here having three engine packages ENG1, ENG2, ENG3. The multi-engine powerplant system 22 generates the power available for flight operations and couples such power to the main rotor system 12 and anti-torque system 18 through the MGB 20.

Figure 2:
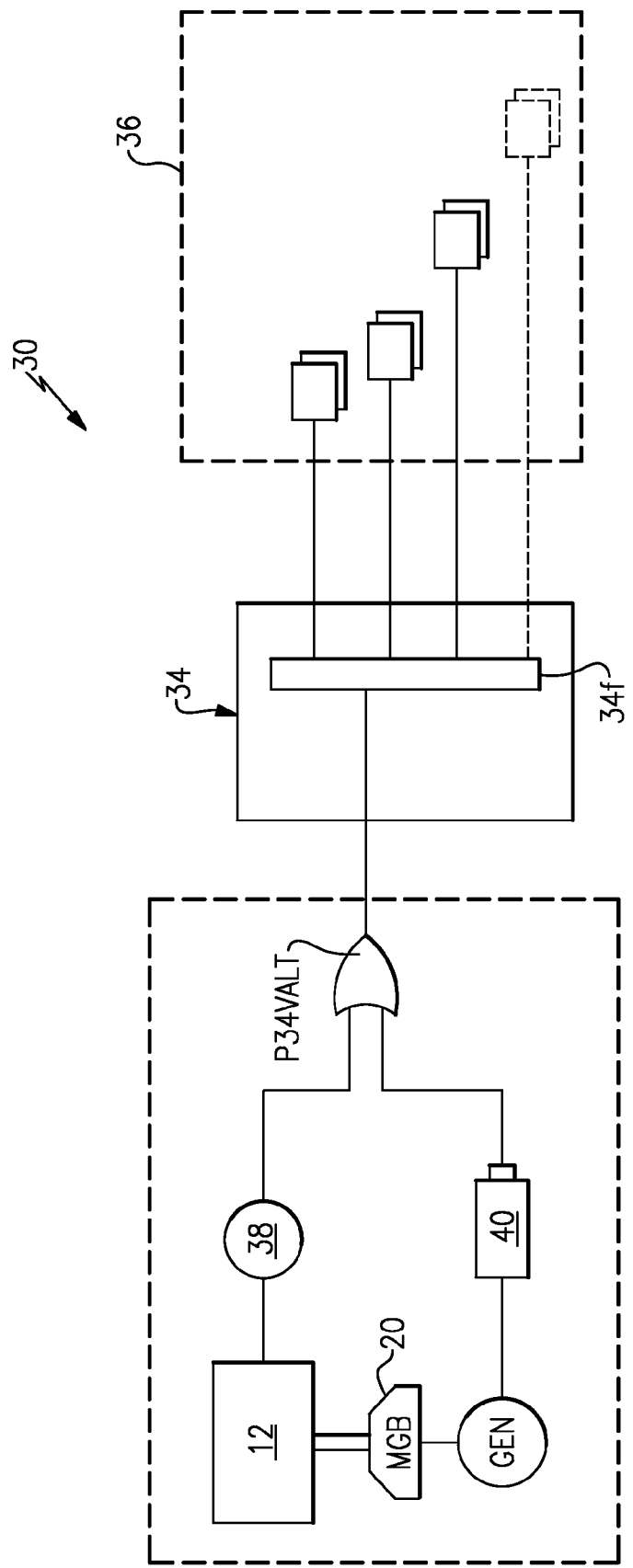
FIG. 2 is a block diagram of an electrical power supply system.

Referring to FIG. 2, an electrical power supply system 30 for the aircraft 10 is illustrated schematically. The electrical power supply system 30 generally includes an electrical generator system 32 which generates electrical power for supply to a module 34 such as a Flight Control Computer (FCC). Feed through power from the module 34 is also communicated to other aircraft modules 36. In the disclosed, non-limiting embodiment, the modules 36A-36n may include Inertial Measurement Units (IMUs), sensors and other external FCC modules.

The electrical power supply system 30 generally includes a first aircraft power source 38 and a second aircraft power source 40. In the disclosed, non-limiting embodiment, the first aircraft power source 38 includes a Permanent Magnet Alternator (PMA) regulated to 34 VDC while the second aircraft power source 40 includes a 28V battery bus. In the disclosed, non-limiting embodiment, the PMA may be driven by the main rotor system 12 and the 28V battery bus may be charged from a generator driven by the MGB 20 compliant with MIL STD 704. The PMA is a separate and independent voltage source from the 28V battery bus. The PMA is primary power, and the battery bus is secondary or back up power for the FCC module 34.

Figure 3:
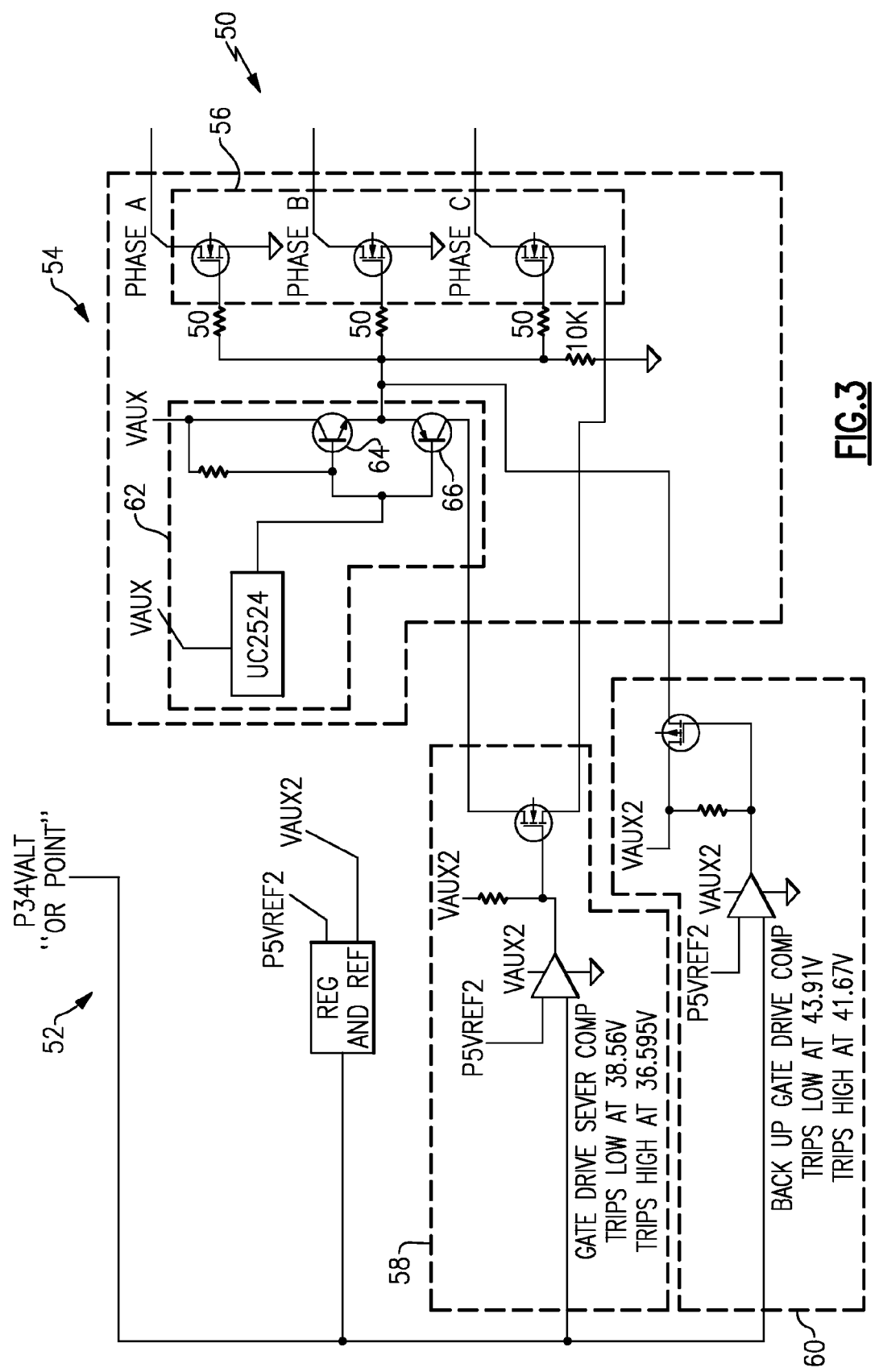
FIG. 3 is a circuit diagram of a power circuit with a PMA Back UP Gate Drive Circuit and a shunt regulator circuit.

Referring to FIG. 3, a power circuit 50 for the FCC module 34 is illustrated schematically. Although the FCC module 34 is disclosed in the illustrated non-limiting embodiment, it should be understood that other critical modules may be supplied by the power circuit 50. The power circuit 50 generally includes a PMA Back UP Gate Drive Circuit 52 and a shunt regulator circuit 54.

Figure 4:
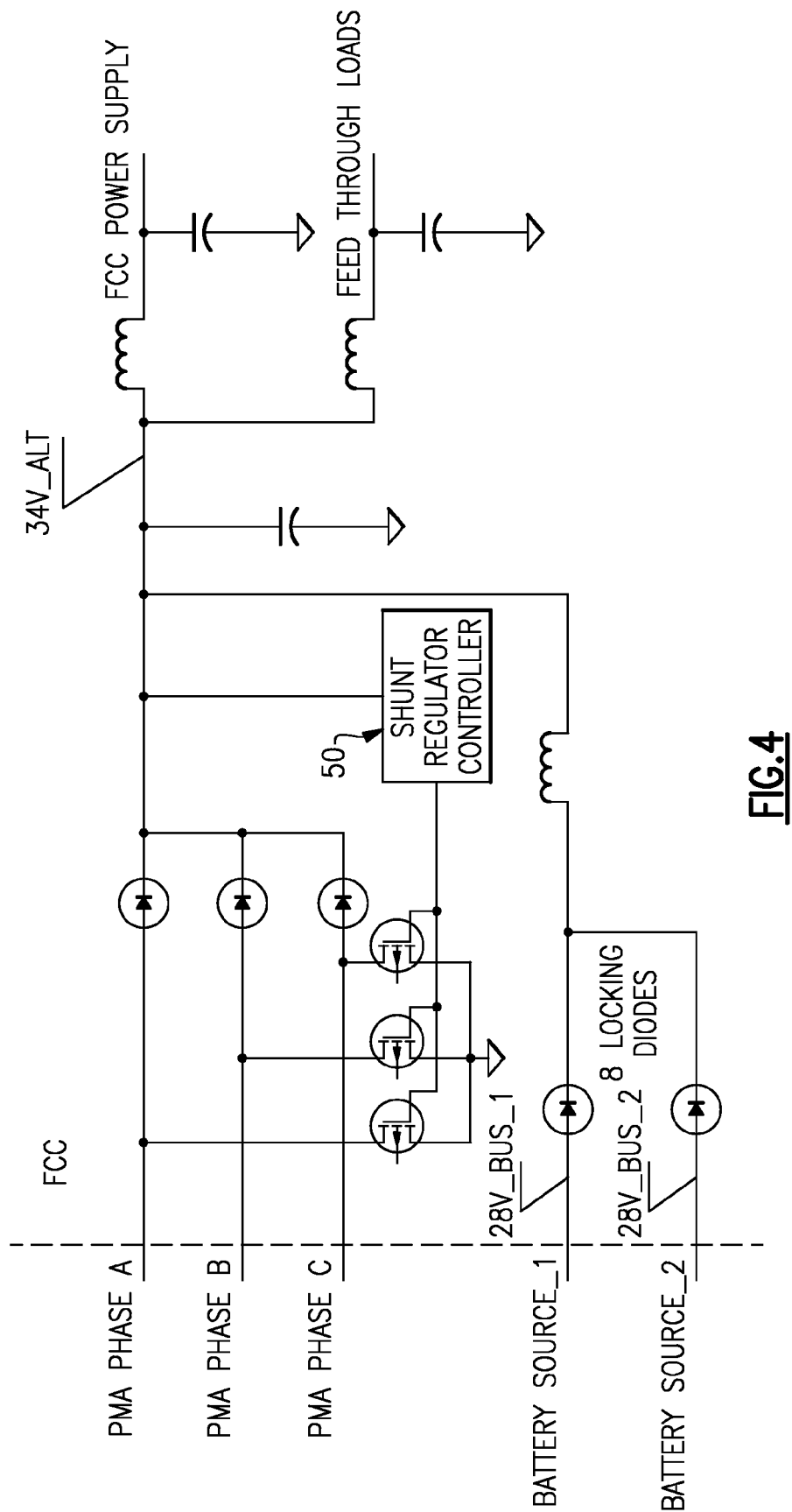
FIG. 4 is a circuit diagram for primary power and secondary or back up power for an FCC module.

The shunt regulator circuit 54 provides a regulated output range of 34 VDC+/−1 VDC. This is a closed loop control circuit which receives 3 PMA AC phase inputs, PHASE A, PHASE B, and PHASE C from the first aircraft power source 38 and converts the 3 PMA AC phase inputs to a DC output. When available, the shunt regulator circuit 54 output of 34 VDC+/−1 VDC provides the necessary voltage and current to operate a power supply 34P for the FCC module 34 (FIG. 4). The power supply 34P in the disclosed non-limiting embodiment includes a DC/DC converter which supplies all the output voltage rails of the power supply 34P, here 3.3V, 5V and 15V in the FCC module 34 (FIG. 2) as well as feed through power which may be supplied to power the modules 36 external to the FCC module 34.

The first aircraft power source 38 and the second aircraft power source 40 are connected together at an "OR point" identified herein as P34VALT. P34VALT is the source voltage for the power supply 34P DC/DC converter as well as for feed through power which may be supplied to power modules 36A-36n external to the FCC module 34.

Blocking diodes in series with the 28V battery bus input (FIG. 4) allows the connection of these two inputs together at the "OR point", P34VALT. In the disclosed, non-limiting embodiment, a 34V level is the output of the shunt regulator circuit 54 so as to back bias the diode connected to the 28V source. In this manner, when the 34V is present, no current is drawn from the 28V sources. If the 34V drops out, a smooth transition to the 28V is provided to the FCC module 34 to assure continued operation thereof.

VAUX, is the primary, here the only, auxiliary voltage which powers the power supply specific electronics such as supervisory comparators, PWM controllers, MosFet gate drive currents, and others. The source of VAUX is the P34VALT voltage at power supply turn on and then a POS15V output takes over control, i.e., bucks out or balances the P34VALT point.

P34VALT is monitored and used to make a back up of VAUX, identified herein as VAUX_2, and P5VREF_2. The source of VAUX2 is P34VALT such that VAUX2 is an independent auxiliary voltage used to supply current to the PMA back up gate drive circuit 52. In the disclosed, non-limiting embodiment, VAUX2 is the result of a low part count regulator circuit and P5VREF the output of a voltage reference (illustrated schematically by REG. and REF block). P5VREF2 is an independent voltage reference for the PMA back up gate drive circuit 52 only and used to set comparator trip points. P5VREF is supplied by VAUX2.

The three PMA AC phase inputs, PHASE A, PHASE B, and PHASE C are diode OR'd together. All three diode cathodes are connected together at the P34VALT node and filtered with large bulk capacitors to store current and filter voltage ripple. Without the shunt regulator circuit 54, the P34VALT node would be an unregulated voltage with significant ripple and subject to large voltage swings dependant upon the load being drawn from the capacitors.

The shunt regulator circuit 54 is a closed loop voltage controlled servo loop, which monitors the P34VALT voltage. By using a fixed-frequency pulse-width-modulation voltage regulator control circuit, the servo loop, (illustrated schematically as a single monolithic chip UC2524) which provides the functions required for the construction of regulating power supplies, controls the P34VALT voltage level to within +/−1 VDC and makes adjustments to compensate for load variations. The servo feedback loop, which controls the P34VALT level, is compensated to maintain stability for all line and load conditions.

Certain failures in the shunt regulator circuit 54 will cause the P34VALT voltage to rise out of regulation. Example of such failures include, but are not limited to, UC2524 output drive failure, loss of VAUX voltage due to shorted attached components such as decoupling capacitors, open NPN bipolar pre-drive transistor, shorted PNP bipolar pre-drive transistor and a PMA shutdown comparator circuit output stuck low. In each case, loss of gate drive to each of the multiple of shunt MosFets used on each of the three PMA AC phase inputs, PHASE A, PHASE B, and PHASE C will result in an over voltage condition on P34VALT.

To assure acceptable reliability limits for a propagated failure from the FCC module 34 to the modules 36 external to the FCC module 34, the PMA Back UP Gate Drive Circuit 52 for the shunt regulator circuit 54 is implemented. The PMA Back UP Gate Drive Circuit 52 directly interfaces to components in the shunt regulator circuit 54 and compensates for failures associated with a loss of gate drive to the multiple of shunt MosFets 56.

An over voltage condition on P34VALT may damage the FCC module 34 and the modules 36 designed to meet MIL STD 704F which establishes the requirements and characteristics of aircraft electric power provided at the input terminals of electric utilization equipment.

If the P34VALT voltage rises up and out of regulation in response to failures associated with a loss of gate drive to the shunt MosFets 56, the PMA Back UP Gate Drive Circuit 52 will turn on for protection such that the following sequence results.

First, gate drive sever comparator circuit 58 trips low at 38.6V and trips high at 36.6V. This releases several of the components that if failed shorted, would prevent the shunt regulator circuit 54 shunt MosFets from receiving their required gate voltages. After release, the Back up gate drive sever comparator circuit 60 trips low at 44.0 and trips high at 42.0V. The difference in the trip levels insures that the back up gate drive sever comparator circuit 60 is not turned on into a potentially shorted component which will otherwise defeat the applied gate drive sever comparator circuit 58.

A pre-drive transistor circuit 62 is operable to control the multiple of shunt MosFets 56. The pre-drive transistor circuit 62 includes an N channel pre-drive transistor 64 in series with the low side P-channel pre-drive transistor 66 and the UC2524 common emitter connections to ground.

If the sensed P34VALT increases out of regulation, first, the gate drive sever comparator circuit 58 releases the P-channel pre-drive transistor 66 connections to ground, to eliminate shorted failure modes.

Second, the back up gate drive sever comparator circuit switches VAUX2 directly into the shunt MosFets 56. The shunt MosFets 56 turn on, reversing the over voltage condition until the voltage drops and turns the gate drive sever comparator circuit 58 and the back up gate drive sever comparator circuit 60 turn back off. This results in the P34VALT voltage regulating between the gate drive sever comparator circuit controlled limits and no failure propagating outside of the FCC module 34. This approach covers all failure modes. The elimination of internal UC2544 transistors (if shorted) by severing their ground path through the N channel FET is key.

Figure 5:
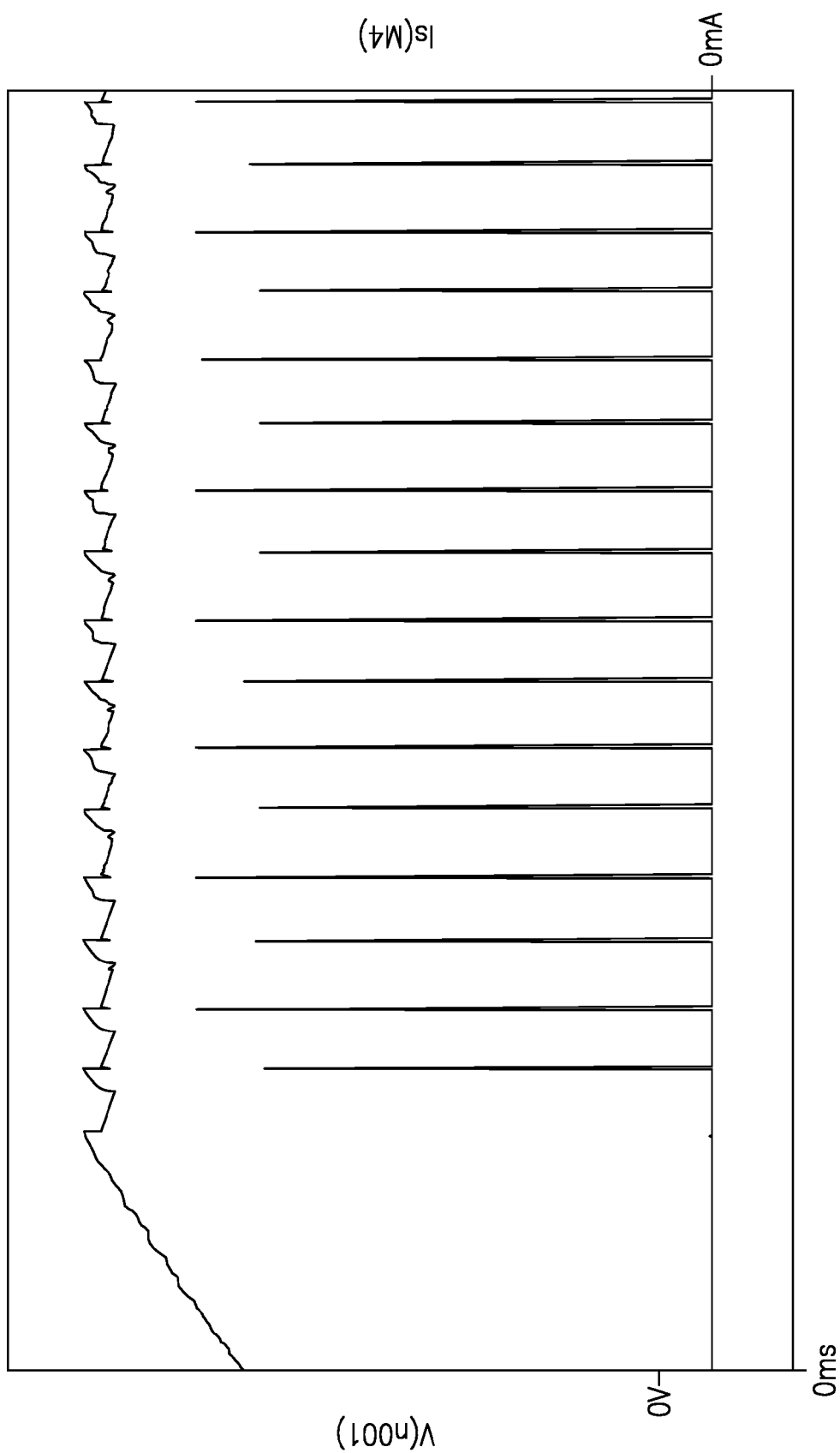
FIG. 5 is a voltage and current trace illustrating operation of the PMA Back UP Gate Drive Circuit which regulates voltage in response to a simulated PNP transistor short.

Referring to FIG. 5, using the PMA Back UP Gate Drive Circuit 52 to provide voltage to the shunt MosFets 56, the voltage of P34VALT is regulated to a regulated voltage. Low duty cycle current slugs are drawn from VAUX2 to turn on the shunt MosFets. Even with an example simulated PNP transistor short, R10=0.001, regulation of P34VALT is readily achieved.

It should be understood that various Built in Test (BIT) features may additionally be provided.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A power circuit comprising:
   a multiple of shunt MosFets;
   a pre-drive transistor circuit operable to control said multiple of shunt MosFets;
   a gate drive sever comparator circuit operable to disconnect said pre-drive transistor circuit from ground in response to an over voltage fault condition; and
   a back-up gate drive comparator circuit operable to switch a reference directly into said multiple of shunt MosFets such that said multiple of shunt MosFets are turned on to reverse said over voltage fault condition until voltage drops and said gate drive sever comparator circuit and said back-up gate drive comparator circuit turn off to maintain a regulated voltage between comparator controlled limits.

2. The power circuit as recited in claim 1, wherein said multiple of shunt MosFets receive powered from a Permanent Magnet Alternator.

3. The power circuit as recited in claim 1, wherein said Permanent Magnet Alternator is driven by a rotor system of a rotary wing aircraft.

4. The power circuit as recited in claim 1, wherein a voltage is controlled between a controlled voltage set by said gate drive sever comparator circuit and said back-up gate drive comparator circuit limits.

5. The power circuit as recited in claim 4, wherein said voltage is communicated to an flight control computer module.

6. The power circuit as recited in claim 4, wherein a voltage limit of said gate drive sever comparator circuit is less than a voltage limit of said back-up gate drive comparator circuit.

7. The power circuit as recited in claim 1, wherein said gate drive sever comparator circuit includes a sever FET in selective communication with ground.

8. The power circuit as recited in claim 7, wherein said gate drive sever comparator circuit is operable to connect a PNP transistor of said pre-drive transistor circuit to ground.

9. The power circuit as recited in claim 1, wherein said back-up gate drive comparator circuit includes a back-up gate drive FET in selective communication with said multiple of shunt MosFets.

10. A method of voltage control for a shunt regulator circuit comprising:
    disconnecting a pre-drive transistor circuit operable to control a multiple of shunt MosFets from ground in response to an over voltage fault condition with a gate drive sever comparator circuit; and
    switching a reference directly into the multiple of shunt MosFets with a back-up gate drive comparator circuit such that the multiple of shunt MosFets are turned on to reverse the over voltage fault condition until voltage drops and the gate drive sever comparator circuit and the back-up gate drive comparator circuit turn off to maintain a regulated voltage between comparator controlled limits.

11. A method as recited in claim 10, further comprising:
    powering the multiple of shunt MosFets with a Permanent Magnet Alternator driven by a main rotor system of a rotary-wing aircraft.

12. A method as recited in claim 10, further comprising:
    supplying the regulated voltage to a flight control computer module.

13. A method as recited in claim 12, further comprising:
    supplying the regulated voltage from the flight control computer module to at least one module external to the flight control computer module.

* * * * *